United States Patent [19]

Mazur

[11] 3,911,537
[45] Oct. 14, 1975

[54] FASTENER
[76] Inventor: Harry E. Mazur, P.O. Box 4508, Palm Springs, Calif. 92262
[22] Filed: Oct. 29, 1973
[21] Appl. No.: 410,486

[52] U.S. Cl. .................................................. 24/245
[51] Int. Cl.² ......................................... A44B 21/00
[58] Field of Search............ 24/245, 81 GS, 205.15, 24/265 H, 222 BS, 224 W, 201 BS, 230 TC, 230 MP, 230 AJ, 230 AV; 16/114

[56] References Cited
UNITED STATES PATENTS

| | | | |
|---|---|---|---|
| 1,701,475 | 2/1929 | Hazelton............................ | 24/245 R |
| 2,172,977 | 9/1939 | Kimball.............................. | 16/114 R |
| 2,256,068 | 9/1941 | Voster ................................ | 24/223 |
| 3,302,826 | 2/1967 | Henchert et al. .................. | 16/114 R |
| 3,542,034 | 10/1970 | Klein.............................. | 24/201 BS |

*Primary Examiner*—Paul R. Gilliam
*Assistant Examiner*—Doris L. Troutman
*Attorney, Agent, or Firm*—Warren, Rubin & Chickering

[57] ABSTRACT

A ring and stud fastener wherein the parts are formed and dimensioned for attachment and separation when in one relative rotated position, but are retained against separation when in all other relative rotated positions. The ring is fashioned in all of its required detail from a single length of resilient wire providing also for snap action attachment and detachment of the parts. In one embodiment, the stud is rotatable on its support to provide the respective attaching and retained positions of the parts.

5 Claims, 12 Drawing Figures

FASTENER

The invention relates to fastening devices in which a pair of fastener sections are formed for demountable attachment.

In many instances it is desirable to be able to readily attach and detach a carrying or shoulder strap to various portable articles such as cameras, binoculars, cases, and the like. However, demountable fastening devices of the lightweight inexpensive type which may have been heretofore used have lacked the durability and particularly the reliability required for enabling their use in connection with relatively expensive items as noted. Accordingly, it has been customary to permanently fasten carrying straps to this type of article, notwithstanding that such straps may in some instances be in the way and interfere with the use of the article to which they are attached.

It is an object of the present invention to provide a fastener of the character described which has such a high degree of reliability and durability as to enable its use with full assurance in the demountable attachment of carrying straps to cameras, binoculars, and similar types of portable expensive equipment.

Another object of the present invention is to provide a fastener of the character above which is adapted for low-cost mass production making possible a wide application of use to a large number of items such as handbags, eyeglasses, briefcases, lock for zipper slider, clothing, bead strings, jewelry clasps, and the like.

A further object of the present invention is to provide a fastener of the character described which is of simple unitary construction without moving parts.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings.

Figure 3:
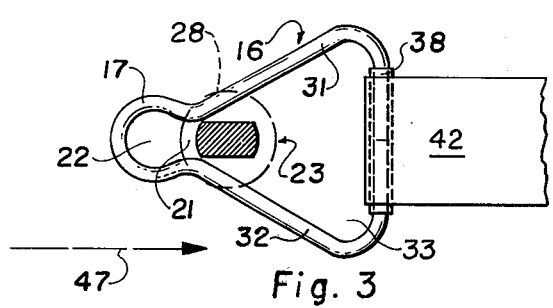
FIG. 3 is a plan view of the fastener with the parts shown in attaching position.
Figure 4:
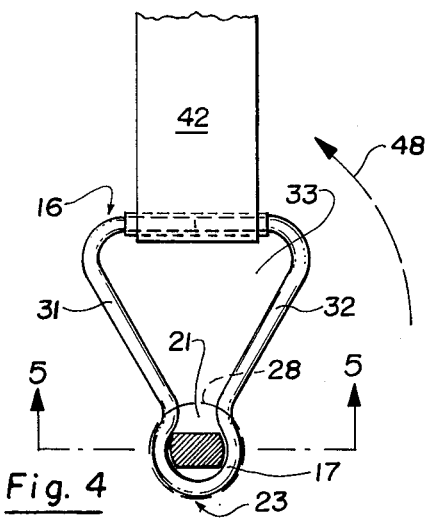
FIG. 4 is a plan view of the fastener with the parts shown in attached position.

The fastener of the present invention comprises briefly a ring member 16 having an arcuate portion 17 somewhat greater than a semi-circle and converging at 18 and 19 to define an entryway 21 to the interior or first opening 22 of portion 17, entryway having a dimension between 18 and 19 less than the interior dimension of opening 22; and a stud 23 having a neck or body with a cross-section having a narrow width dimension 24 fashioned for passage through entryway 21 when the stud and ring member are in relative rotated positions presenting the narrow width dimension to the entryway (FIGS. 1 and 3), the stud also having an angularly displaced larger width dimension 25 less than the internal dimension of opening 22 but larger than the width dimension of entryway 21 to prevent withdrawal of the stud through the entryway when the stud and ring member are in a relative rotated position presenting orienting or the larger dimension 25 to the entryway (FIG. 4).

As a feature of the present invention, ring member 16 is here formed as a one piece continuous length of resilient wire, such as stainless steel, and the dimension of entryway 21 is made slightly less than the narrow dimension 24 so that the passage of the stud through the entryway will be effected with snap action. As will be noted, the opposed sides 18 and 19 of entryway 21 are rounded convexly toward each other so as to provide a camming action on the sides of the entryway as a forced passage therethrough of the stud is effected.

Figure 2:
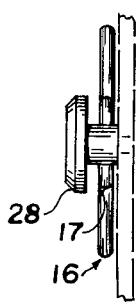
FIG. 2 is a side elevation of the fastener as depicted by line 2—2 of FIG. 1.
Figure 8:
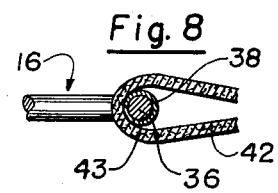
FIG. 8 is a cross sectional view taken substantially on the plane of line 8—8 of FIG. 7.
Figure 5:
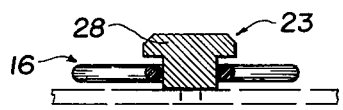
FIG. 5 is a cross sectional view of the fastener taken substantially on the plane of line 5—5 of FIG. 4.

As will be further observed from FIGS. 2 and 5, a head 28 is provided on stud 23 having a dimension greater than the external diameter of arcuate portion 17, see FIGS. 2 and 4 for retaining the ring member on the stud when the parts are moved to assembled position as illustrated in FIG. 4. Ring member 16 is formed with legs 31 and 32 contiguous with and diverging from the opposite ends 18 and 19 of the arcuate portion 17 so as to provide an enlarged open area or second opening 33 between legs 31 and 32 larger than the diameter of head 28 for permitting separation of the ring member and stud when the enlarged area or second opening 33 and the head are moved into registration. As will be further observed from the drawings, legs 31 and 32 are formed with inturned coaxially aligned and substantially abutting ends 36 and 37 which close the enlarged open area or second opening 33 opposite to entryway 21. Ends 36 and 37 may be secured in any desired fashion. As a feature of the present construction, ends 36 and 37 are pressed into a sleeve 38 having a length substantially equal to the combined length of the inturned ends. The telescopic mounting of sleeve 38 on the coaxially aligned ends is most effective in securely locking the ends in place without requirement of welding or similar fastening of the ends of the ring member. At the same time, the sleeve provides a convenient point of attachment of one end 41 of a carrying strap 42, the latter being formed with a strap loop 43 surrounding the sleeve, see FIG. 8, to provide free swivel action. The sleeve also functions to distribute the bearing force of the strap uniformly over the length of inturned ends 36 and 37 thereby affording an exceptionally strong structure.

Figure 1:
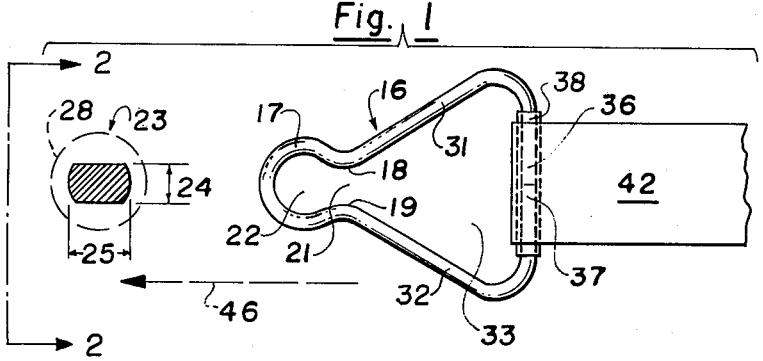
FIG. 1 is an exploded plan view of a fastener constructed in accordance with the present invention.
Figure 7:
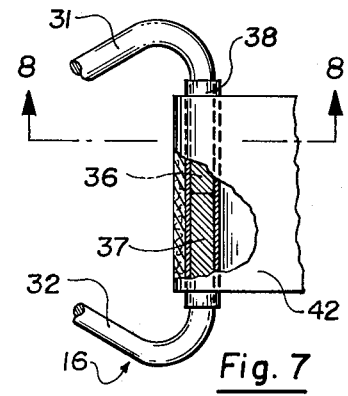
FIG. 7 is a fragmentary plan view partially in section and on an enlarged scale of one of the fastener elements.
Figure 6:
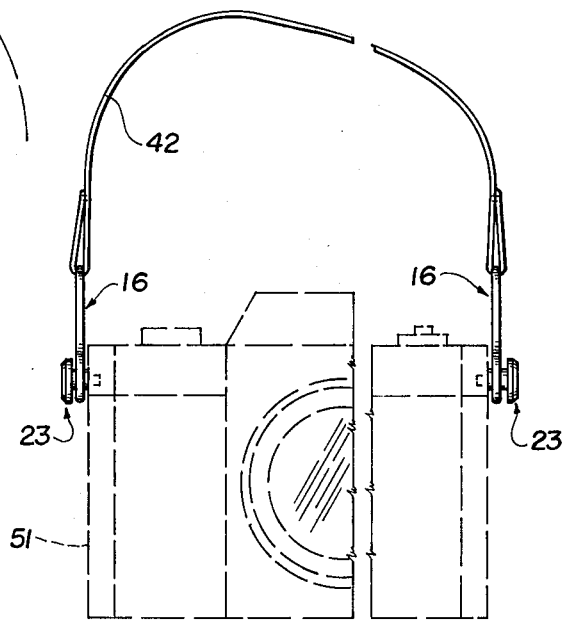
FIG. 6 is a side elevation of a pair of fasteners in attached position and as connected to a shoulder strap and camera.

In the normal use of the fastener, ring member 16 will be swung into a position generally aligned with the narrow dimension 24 of stud 23, as depicted in FIG. 1. The enlarged opening 33 of the ring member will be placed over the head 28, as suggested by arrow 46 in FIG. 1, and the ring member retracted to place entryway 21 in registration with the narrow dimension 24 of stud 23, as seen in FIG. 3. Further movement of the ring member, as suggested by arrow 47, will cause the stud to move into and resiliently spread the entryway followed by a snap action movement of the stud into the interior or first opening 22 of arcuate portion 17. Thereafter, the ring member is swung around the stud as suggested by arrow 48 in FIG. 4 so as to place the larger stud dimension 25 opposite the narrow passageway 21 thereby locking the parts in place, as seen in FIG. 4. Normally, the attached position of the parts, FIG. 4, will have a vertical orientation so that the weight of the attached article, such as camera 51 here depicted, depending from strap 42 will retain the locked orientation of the parts, see FIG. 6. In the illustrated use of the fastener, FIG. 6, a pair of studs 23 will be fastened to the opposite sides of the article to be carried and a pair of ring members 16 will be secured to the opposite ends of strap 42 in the manner illustrated in FIGS. 7 and 8. Accordingly, the strap will always be attached to the article unless the user swings the strap ends into a rotated, horizontal position so as to align the ring member passageway 21 with the narrow dimension 24 of the stud. In this position the ring member may be detached from the stud, deliberately, and with some force, accompanied by a snap action springing of the ring member. In all other rotated positions of the ring member on the stud, the parts are held securely and dependably in positively engaged position. The fastener thus provides for a full swivel action of the ring member on the stud without fear of detachment which can be effected only by a deliberate precise alignment of the parts followed by a forced separation. While the narrow and large dimensions 24 and 25 of the stud are displaced by 90° it will be understood that other angular displacements may be used. The swivel action of the ring member on the stud, together with the swivel action of the strap ends on sleeves 38 provides full universal movement of the strap with respect to the article supported.

A modified form of the invention is illustrated in FIGS. 9 to 12 and is designed to accommodate the fastener to those uses and installations in which a swinging of the ring member through its 90° manipulation to effect attachment and locking is not desired or feasible. Accordingly, this form of the invention provides for attachment and locking of the fastener sections by a straight ahead and reciprocal movement of the ring member. The selected engagement and locking of the ring and stud members is accomplished as in the above described embodiment by the bi-dimensional construction of the stud. However, the engagement and locking operation is effected by a relative rotation of the stud rather than the ring member thereby permitting the attachment of the parts of a straight rectilinear movement of the ring member.

Figure 9:
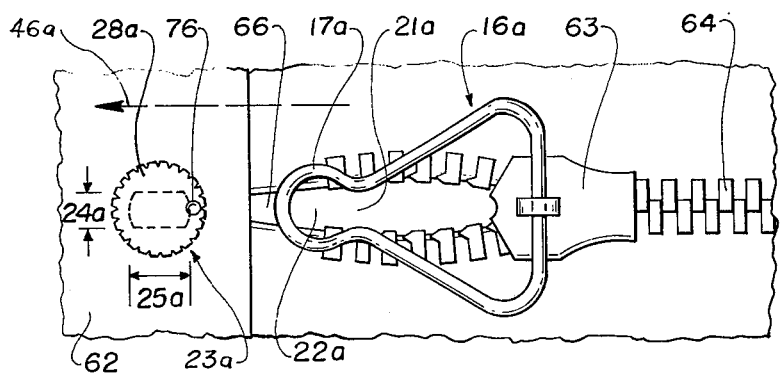
FIG. 9 is a plan view of a modified form of fastener.
Figure 10:
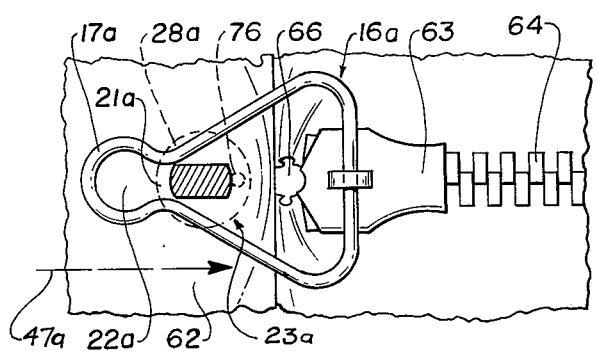
FIG. 10 is a plan view of the fastener illustrated in FIG. 9, but in a different position of the parts.
Figure 11:
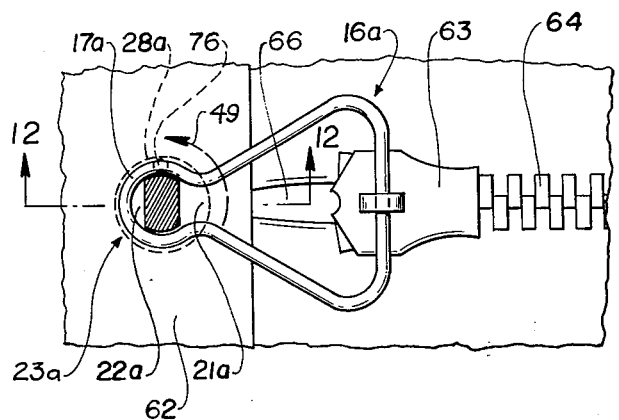
FIG. 11 is a plan view of the fastener illustrated in FIGS. 9 and 10 and with the fastener parts in still another position.
Figure 12:
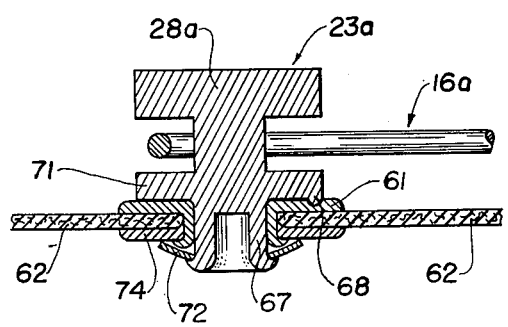
FIG. 12 is a fragmentary cross sectional view on an enlarged scale of the fastener taken substantially on the plane of line 12—12 of FIG. 11.

With reference to FIGS. 9 – 11, it will be noted that ring member 16a is of identical construction to ring member 16 of the first described embodiment in its fabrication from a single length of resilient wire formed with arcuate portion 17a and reduced entranceway 21a to the interior opening 22a of the arcuate portion 17a. Stud 23a is similarly formed with the angularly related narrow and wide dimensions 24a and 25a which function in the same manner as their counterparts 24 and 25. However, in this form of the invention stud 23a is rotatably carried on a supporting member 61 in turn secured to one of the objects 62 to be fastened. The straight line fastening movement of the ring member makes this form of the invention well adapted for use with the slider 63 of a conventional zipper 64 as illustrated. In such case, stud 23a is fastened in position in alignment with the end of the seam opening 66 closed by the zipper. Where the fastener is applied to an article of clothing, as here illustrated, stud 23a may be riveted to the fabric in the position noted. For this purpose stud 23a is formed with an axially extending stem 67 rotatably journaled in support member 61 here in the form of an eyelet riveted together on opposite sides of the fabric 62.

Preferably, detent means 68 is provided for indicating to the user whether the narrow or broad side of the stud is turned into alignment with the entryway 21a of the ring member. Such means may comprise an interfitting dimple and recess provided on the confronting surfaces of a base disk 71 on stud 23a, see FIG. 12, and supporting member 61, the surfaces being resiliently pressed together by a spring washer 72 compressed between the distal end 73 of stem 67 and the underside 74 of the eyelet support member 61.

Stud head 28a may be knurled as indicated in FIG. 9 to assist in manual engagement in turning of the stud; and a locating mark 76 is preferably provided on the head to indicate its positioning for attachment and removal of the ring member 16a. For example, in attaching the fastener, head 28a will be rotated in the position illustrated in FIGS. 9 and 10 aligning the narrow side of stud 23a in alignment with entryway 21a. In such position, the ring member 16a is first advanced as suggested by arrow 46a, FIG. 9, then swung over head 28a, as seen in FIG. 10, and then drawn back in the direction of arrow 47a to cause the entry of the stud, with snap action, into the interior 22a of the ring member. Thereupon, head 28a may be rotated, as suggested by arrow 49, to position the stud member broadside to entryway 21, as seen in FIG. 11, thereby retaining the parts in attached position.

I claim:

1. A snap-acting swivel fastener comprising:
   a ring member having an arcuate portion extending circumferentially in an amount greater than a semicircle to define a first opening, said ring member converging from said arcuate portion to define an entryway to said first opening of a width less than the diameter of said first opening, and said ring member diverging from said entryway to define a second opening larger than said first opening, and said ring member being formed of a resilient material for expandable outward displacement of said entryway; and
   a stud having a neck portion mounted to extend through said first opening and a head portion dimensioned to retain said ring member against withdrawal axially from said first opening but to permit withdrawal axially from said second opening, said neck portion having a non-circular cross-section with a narrow width dimension and an angularly displaced larger width dimension, said narrow width dimension being greater than the width of said entryway but small enough to allow said narrow width dimension of said stud to be aligned with and urged through said entryway by resiliently outwardly displacing said entryway, said larger width dimension being less than the diameter of said first opening so as to rotatably fit therein and being large enough to prevent passage of said stud through said entryway for substantially all angular positions of said stud with respect to said entryway except upon alignment of said narrow width dimension with said entryway.

2. A fastener as defined in claim 1, and a support;

said stud being rotatably mounted on said support for selective rotation between a position orienting said narrow width dimension in alignment with said entryway and a position orienting said larger width dimension at least partially across said entryway.

3. A fastener as defined in claim 2, and detent means mounted proximate said stud and formed for cooperative engagement with said stud to resist rotation of said stud when positioned with said larger width dimension at least partially across said entryway.

4. A fastener as defined in claim 1 wherein, said second opening in said ring member is defined by leg portions diverging from said entryway, and said leg portions have in-turned, coaxially aligned, and substantially abutting ends closing said second opening opposite to said entryway; and a sleeve telescopically mounted on said in-turned ends, said sleeve having a length substantially equal to the combined lengths of said in-turned ends.

5. A fastener as defined in claim 4 wherein, said ring member is formed as a one-piece continuous length of resilient wire; and said ring member is formed with convexly curved portions adjacent said entryway for camming action against said stud.

* * * * *

UNITED STATES PATENT OFFICE
CERTIFICATE OF CORRECTION

PATENT NO. : 3,911,537
DATED : October 14, 1975
INVENTOR(S) : Harry E. Mazur

It is certified that error appears in the above-identified patent and that said Letters Patent are hereby corrected as shown below:

Column 2, lines 20 and 21, change "presenting orienting or" to ---orienting or presenting---.

Column 3, line 58, after "parts" change "of" to ---by---.

Signed and Sealed this ninth Day of March 1976

[SEAL]

*Attest:*

RUTH C. MASON
*Attesting Officer*

C. MARSHALL DANN
*Commissioner of Patents and Trademarks*